United States Patent
Solt

(10) Patent No.: US 8,924,590 B2
(45) Date of Patent: Dec. 30, 2014

(54) SYSTEM AND METHOD FOR COMMUNICATING IN A NETWORKED SYSTEM

(75) Inventor: David George Solt, Richardson, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2281 days.

(21) Appl. No.: 11/353,548

(22) Filed: Feb. 14, 2006

(65) Prior Publication Data

US 2007/0192497 A1 Aug. 16, 2007

(51) Int. Cl.
  G06F 15/173 (2006.01)
  H04L 12/801 (2013.01)
  H04L 12/825 (2013.01)

(52) U.S. Cl.
  CPC .............. *H04L 47/10* (2013.01); *H04L 47/266* (2013.01)
  USPC ......................................................... 709/243

(58) Field of Classification Search
  CPC G06F 15/173; G06F 15/17337; G06F 15/163
  USPC ......................................................... 709/243
  See application file for complete search history.

(56) References Cited

U.S. PATENT DOCUMENTS

| | | | | |
|---|---|---|---|---|
| 5,363,493 | A * | 11/1994 | Unverrich | 714/47 |
| 6,278,695 | B1 * | 8/2001 | Christensen et al. | 370/254 |
| 6,412,018 | B1 | 6/2002 | Tuel, Jr. | |
| 6,415,332 | B1 | 7/2002 | Tuel, Jr. | |
| 6,751,791 | B2 | 6/2004 | Inaba | |
| 6,782,537 | B1 | 8/2004 | Blackmore | |
| 6,826,622 | B2 | 11/2004 | Maciel | |
| 7,089,323 | B2 * | 8/2006 | Theimer et al. | 709/238 |
| 2002/0083116 | A1 | 6/2002 | Petrini | |
| 2004/0095946 | A1 * | 5/2004 | Baker | 370/405 |
| 2004/0103218 | A1 | 5/2004 | Blumrich | |
| 2005/0050162 | A1 | 3/2005 | Maciel | |
| 2005/0132089 | A1 * | 6/2005 | Bodell et al. | 709/249 |
| 2007/0174558 | A1 * | 7/2007 | Jia et al. | 711/147 |
| 2008/0144619 | A1 * | 6/2008 | Awsienko et al. | 370/389 |

OTHER PUBLICATIONS

IEEE. "ANSI/IEEE Std 802.5-1998E—Part 5: Token ring access method and Physical Layer specifications". May 26, 1998. IEEE. 5, 14-19, 24.*
Saltzer et al. A Star-Shaped Ring Network with High Maintainability. May 1979.*
Honda et al. Language Primitives and Type Discipline for Structured Communication-Based Programming. 1998.*
Sen et al. Survivable Routing in WDM Networks—Logical Ring in Arbitrary Physical Topology.2002. IEEE. p. 2771-2775.*
Banikazemi et al. MPI-LAPI: An Efficient Implementation of MPI for IBM RS/6000 SP Systems. Oct. 2001. IEEE.*
Bruck et al. Efficient Algorithms for All-to-All Communications in Multiport MEssage-Passing Systems. 1999. IEEE.*

(Continued)

*Primary Examiner* — Bryan Lee
(74) *Attorney, Agent, or Firm* — Fletcher Yoder; David M. Hoffman

(57) ABSTRACT

There is provided a system and method for communicating in a networked system. More specifically, in one embodiment, there is provided a computer system comprising a plurality of endpoints, each of the endpoints being configured to transmit data messages to each of a plurality of other endpoints by transmitting data messages to only a respective subset of endpoints at any given time.

19 Claims, 6 Drawing Sheets

(56) References Cited

OTHER PUBLICATIONS

Jiuxing Liu, Amith R. Mamidala, and Dhabaleswar K. Panda, Fast and Scalable MPI-Level Broadcast using InfiniBand's Hardware Multicast, Computer and Information Science, The Ohio State University.

Jiuxing Liu, Balasubramanian Chandrasekaran, Jiesheng Wu, Weilhang Jiang, Sushmitha Kini, Weikuan Yu, Darius Buntinas, Peter Wycoff, and D.K. Panda, Performance Comparison of MPI Implementations over InfiniBand, Myrinet and Quadrics, Computer Information Science, The Ohio State University.

Peter Sanders and Jesper Larsson Traff, The Factor Algorithm for regular All-to-all Communication on Clusters of SMP Nodes.

Sayantan Sur, Hyun-Wook Jin and Dhabaleswar K. Panda, Efficient and Scalable All-to-All Personalized Exchange for InfiniBand-based Clusters, Computer and Information Science, The Ohio State University.

Jiesheng Wu, Pete Wyckoff and Dhabaleswar Panda, High Performance Implementation of MPI Derived Datatype Communication over InfiniBand, Computer and Information Science, The Ohio State University.

Jelena Pjesivac-Grbovic, Thara Angskun, George Bosilca, Graham E. Fagg, and Edgar Gabriel Jack J. Dongarra, Performance Analysis of MPI Collective Operations, University of Tennessee.

Ahmad Faraj and Xin Yuan, An Empirical Approach for Efficient All-to-All Personalized Communication on Ethernet Switched Clusters, Department of Computer Science, Florida State University.

Sathish V. Vadhiyar, Graham E. Fagg and Jack Dongarra, Automatically Tuned Collective Communications, Computer Science Department, University of Tennessee.

Introduction to MPI—created by the PACS Training Group, NCSA Acccess, 2001 Board of Trustees of the University of Illinois.

\* cited by examiner

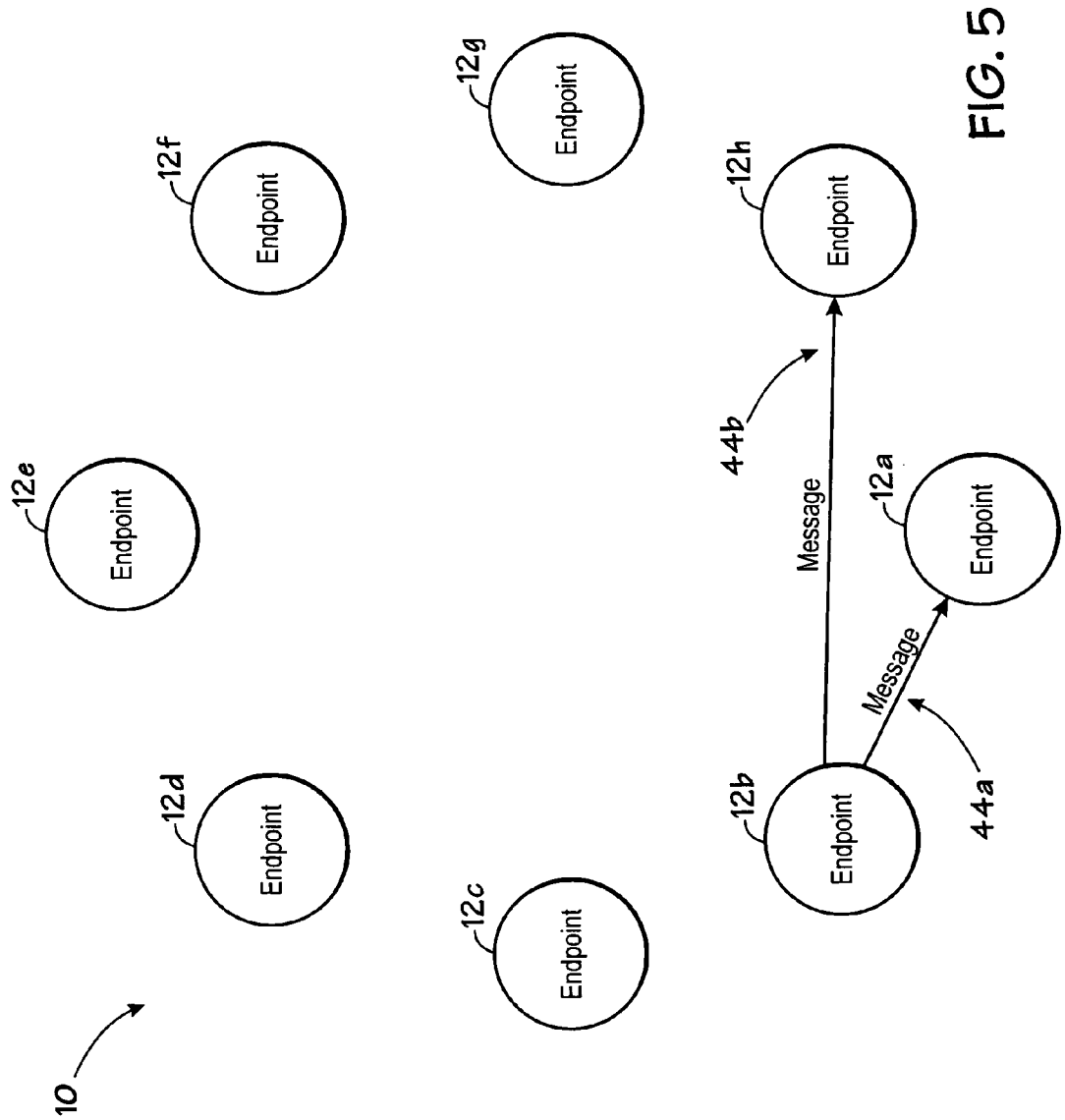

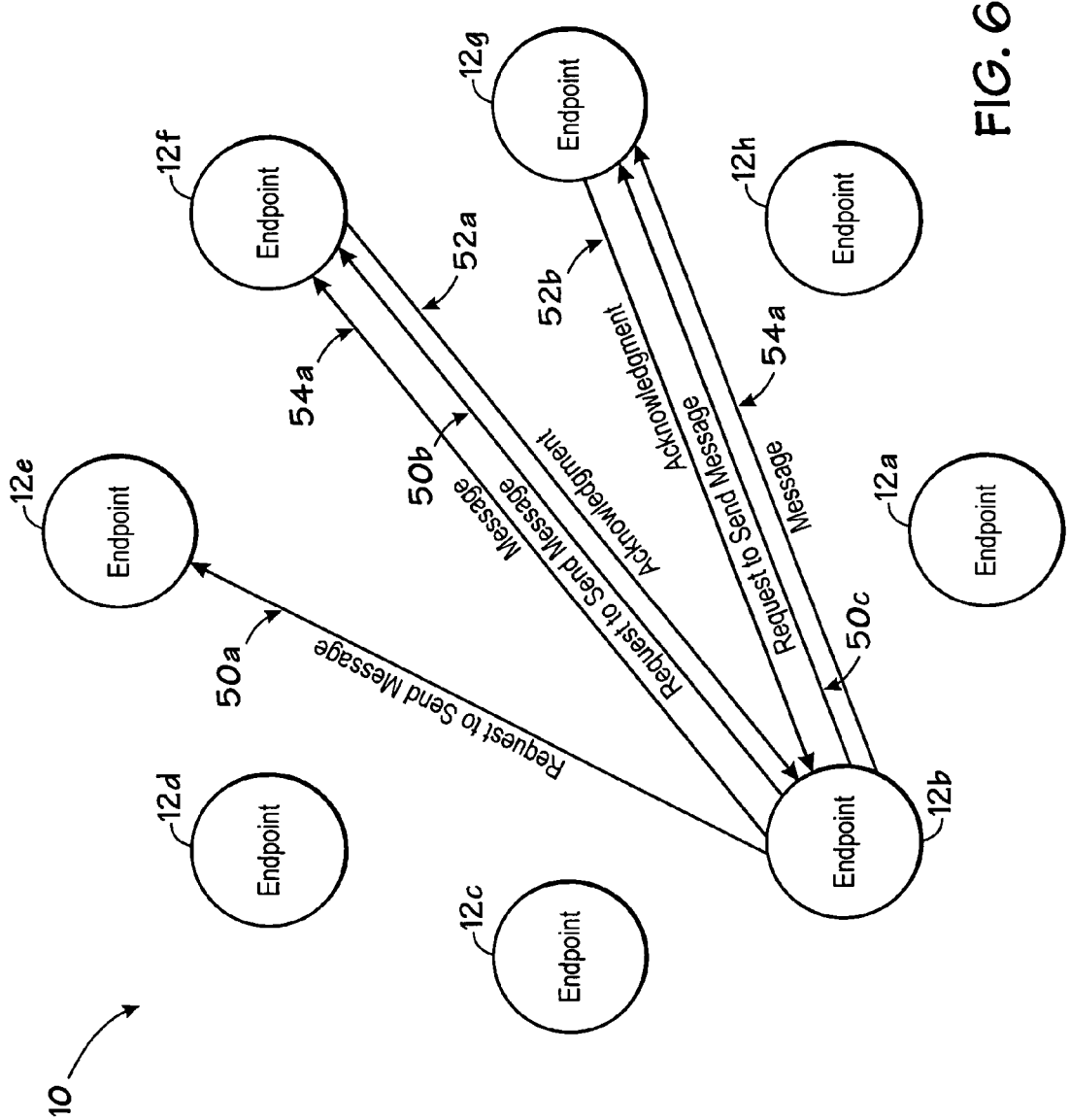

SYSTEM AND METHOD FOR COMMUNICATING IN A NETWORKED SYSTEM

BACKGROUND

This section is intended to introduce the reader to various aspects of art, which may be related to various aspects of the present invention that are described and claimed below. This discussion is believed to be helpful in providing the reader with background information to facilitate a better understanding of the various aspects of the present invention. Accordingly, it should be understood that these statements are to be read in this light, and not as admissions of prior art.

Multiple computers and/or processors are frequently networked together so that the multiple computers and/or processors can be collectively used to solve a single problem or perform a single large calculation or set of calculations. Typically, these multiple computers and/or processors coordinate with each other by communicating via the network. These networked systems may include the computers and/or processors themselves (hereafter referred to as "endpoints"), a central switch, and one or more connections interconnecting the endpoints with the central switch. In such systems, the switch is generally responsible for routing messages from a source endpoint to a destination endpoint. However, the connections between the source endpoint and the destination endpoint are typically only able to transmit a fixed amount of data during a given unit of time. This capacity is referred to as the bandwidth of the connection.

It may be possible for more data to arrive at the switch than the switch can deliver to the destination endpoint. For example, if each of the connections within a networked system has the same bandwidth, the switch can become overloaded if multiple source endpoints each transmit data at the same time to a single destination endpoint. Those of ordinary skill in the art will appreciate that the switch's delivery of data to the destination endpoint is limited by the bandwidth of the connection between the switch and the destination endpoint; whereas the amount of data that can arrive from multiple source endpoints is a function of the number of source endpoints that transmit data to the switch. In other words, if multiple source endpoints simultaneously attempt to transmit data to a single destination endpoint, the switch may be unable to deliver the received data over the single connection to the destination endpoint as quickly as the switch is receiving data over multiple connections from multiple source endpoints.

Typical switches attempt to compensate for this potential issue by including buffer storage within the switch to store "backed-up" messages until they can be sent to the destination endpoint. However, if this buffer storage fills up, incoming messages for the destination endpoint may be dropped or lost. This condition is referred to as "switch saturation." In conventional networked systems, such as transmission control protocol/internet protocol ("TCP/IP") systems, switch saturation results in messages having to be resent by their respective source endpoints. This retransmission can slow down the processing of data by the networked system and degrade its performance. An improved technique for communicating in a networked system would be desirable.

BRIEF DESCRIPTION OF THE DRAWINGS

Advantages of the invention may become apparent upon reading the following detailed description and upon reference to the drawings in which:

FIG. 5 is a diagram illustrating an endpoint sending messages to other endpoints in accordance with embodiments of the present invention; and FIG. 6 is a diagram illustrating the above-described techniques for transmitting and receiving messages at a time period following the transactions illustrated in FIGS. 3, 4, and 5 in accordance with embodiments of the present invention.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The exemplary embodiments described below may be directed towards systems and/or methods for communicating in a networked system. For example, in one embodiment, a plurality of endpoints in a networked system is configured to limit the number of messages simultaneously transmitted between each of the plurality of endpoints. In another embodiment, a plurality of endpoints in a networked system are arrayed logically into a circular array and each of the plurality of endpoints is configured to transmit data to other endpoints in the networked system in an order based on each endpoint's respective position within the circular array.

Figure 1:
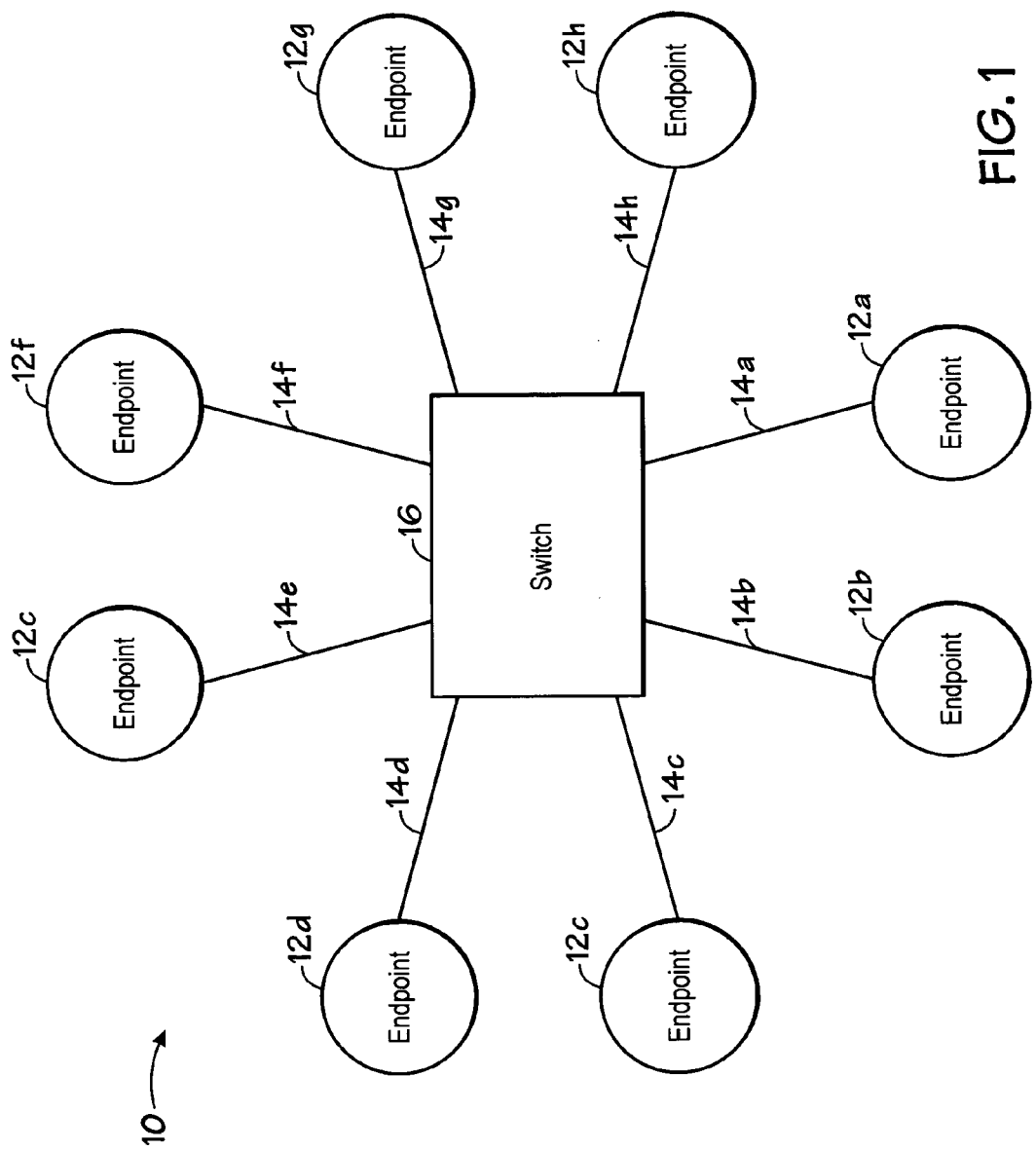
FIG. 1 is a diagram of a networked system in accordance with embodiments of the present invention.

Turning initially to FIG. 1, a block diagram of an exemplary networked system in accordance with one embodiment is illustrated and generally designated by a reference numeral 10. As illustrated in FIG. 1, the networked system 10 may include a plurality of endpoints 12a, 12b, 12c, 12d, 12e, 12f, 12g, and 12h (hereafter referred to as "12a-h"), a plurality of connections 14a, 14b, 14c, 14d, 14e, 14f, 14g, and 14h (hereafter referred to as "14a-h"), and a switch 16. In one embodiment, the system 10 may be located in a single chassis, such as a multi-processor computer system. In other embodiments, the system 10 may be a distributed system with endpoints 12a-h located in a variety of different locations interconnected to each other via the connections 14a-h and the switch 16.

The endpoints 12a-h may comprise any suitable type of electronic component and/or device capable of cooperating with other electronic components and/or devices to perform a function or solve a problem. In one embodiment, the endpoints 12a-h are Central Processing Units ("CPUs"), such as the Itanium processor produced by Intel Corporation, the Alpha EV7, produced by Alpha Processors, the Opteron produced by Advanced Micro Devices, and the Power 4/5 produced by International Business Machines. It will be appreciated, however, that the above-listed CPUs are merely exemplary, and in alternate embodiments, other suitable processors may be employed in the system 10. In other embodiments, the endpoints 12a-h may include independent computers systems, such as the ProLiant DL 380 manufactured by Hewlett-Packard Company. In still other embodiments, the endpoints 12a-h may be electronic devices with functionality between a processor and a complete computer system. For example, the endpoints 12a-h may be cellular telephones, personal digital assistants ("PDA"), and/or other suitable electronic devices.

As illustrated in FIG. 1, the networked system may also include connections 14a-h to connect the endpoints 12a-h with the switch 16. The connections 14a-h may involve any suitable form of electronic data transmission capable of carrying data between the endpoints 12a-h and the switch 16. For example, the connections 14a-h may be wires or cables, such as copper wire, fiber-optic cable, category 5 ("CAT5") cable, serializer/deserializer ("SERDES") link, or other suitable physical connections. Alternatively, the connections may be wireless connections employing any one of a number of suitable wireless protocols, such as I.E.E.E. 802.11, or WiMAX™.

The switch 16 may be any type of switch and/or router capable of receiving signals, data, and/or messages from one of the endpoints 12a-h and routing the messages to another one of the endpoints 12a-h. In one embodiment, the switch 12 may include a transmission control protocol/internet protocol ("TCP/IP") router or switch. In another embodiment, the switch 16 may include a circuit or chipset configured to route transmissions between one or more processors. It will be appreciated, however, that the above-described switches are merely exemplary, and, thus, not intended to be exclusive.

As described above, the endpoints 12a-h in the system 10 are configured to communicate with each other via the switch 16 to cooperatively perform calculations and/or solve problems. This communication may be aided by standards, such as the message passing interface ("MPI"), a protocol developed to govern the communication between the endpoints 12a-h. In the interest of clarity and brevity, the operation of the system 10 will be described using the MPI protocol. It will be appreciated, however, that MPI is merely one example of a communication interface/library. As such, in alternate embodiments, other communication interfaces, such as the parallel virtual machine ("PVM") protocol, may also be employed.

MPI is an interface characterized by reliable, in-order, and matched/tagged messages between the endpoints 12a-h. In an MPI environment, each endpoint 12a-h makes an explicit call to send a message to another endpoint 12a-h and the receiving endpoint 12a-h makes a matching acknowledgement before a message can be delivered. In other words, the receiving endpoint 12a-h acknowledges the call before a data message (i.e., the actual data itself) is transferred. As such, for most message transfer requests, the matching of sends and receives (a "handshaking" procedure) generally occurs before the actual message data is transmitted to the destination endpoint 12a-h. This is done to provide flow control of messages within the system 10. In one embodiment, this handshaking procedure involves three steps. First, a transmitting endpoint sends a short "request-to-send" message that includes sufficient detail about the larger data message that the transmitting endpoint 1 2a-h wants to transmit. Second, when the receiving endpoint 12a-h receives the request-to-send message, it can signal the transmitting endpoint 1 2a-h and agree to accept the data message by sending an "acknowledgement" message to the transmitting endpoint 12a-h. Third, the transmitting endpoint 12a-h can transmit the data message in response to the acknowledgement message.

As described above, the MPI message passing library provides a standard protocol for exchanging messages between the endpoints 12a-h. Conventional systems, however, provide either no mechanism or inefficient mechanisms for avoiding saturation of the switch 16. In other words, in conventional systems, there is no control placed on the number of messages that the endpoints 12a-h may attempt to transmit or the number of messages that the endpoints 12a-h may attempt to receive. This lack of control leads to switch saturation. Although switch saturation may occur in conventional systems during virtually any type of communication, a subset of the MPI protocol known as "all-to-all" communication is especially prone to switch saturation. As its name implies, all-to-all communication involves each of the nodes 12a-h transmitting information to each of the other nodes 12a-h. Examples of MPI all-to-all communication functions include MPI_Alltoall, MPI_Alltoallv, MPI_Allgather, and MPI_Allgaterv. Because all-to-all communication functions are particularly susceptible to switch saturation, the techniques described below in regard to FIGS. 2-6 involve all-to-all communication within the system 10. It will be appreciated, however, that all-to-all communication is merely one example of communication within the system 10. As such, in alternate embodiments, the techniques described herein may be employed in other types of endpoint inter-communication.

Figure 2:
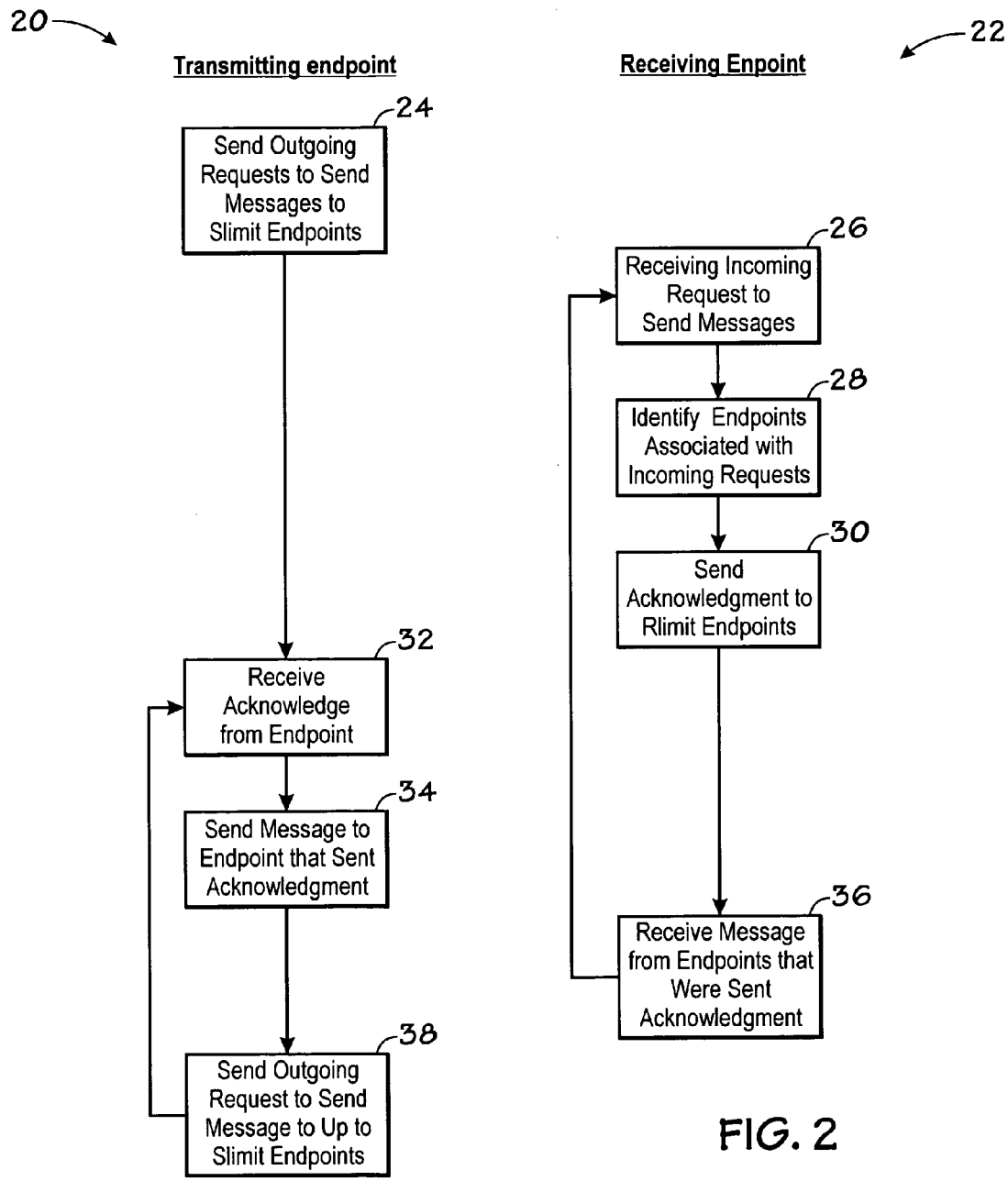
FIG. 2 illustrates a technique for transmitting messages in a networked system and a technique for receiving messages in a networked system in accordance with embodiments of the present invention.

Turning next to FIG. 2, a technique 20 for transmitting messages in the system 10 and a technique 22 for receiving messages in the system 10 are illustrated. As described above, communication between the endpoints 12a-h may involve a handshaking procedure in which the transmitting endpoint 12a-h requests permission to transmit a message and the receiving endpoint 12a-h acknowledges and approves the request-to-send message. For this reason, the techniques 20 and 22 illustrated in FIG. 2 are illustrated and will be described in conjunction with each other. It will be appreciated, however, that the endpoints 12a-h need not employ both techniques. For example, the endpoints 12a-h may employ the technique 20 for transmitting messages and employ conventional techniques for receiving messages. Conversely, the endpoints 12a-h may also employ conventional techniques for transmitting messages and employ the technique 22 for receiving messages.

Figure 3:
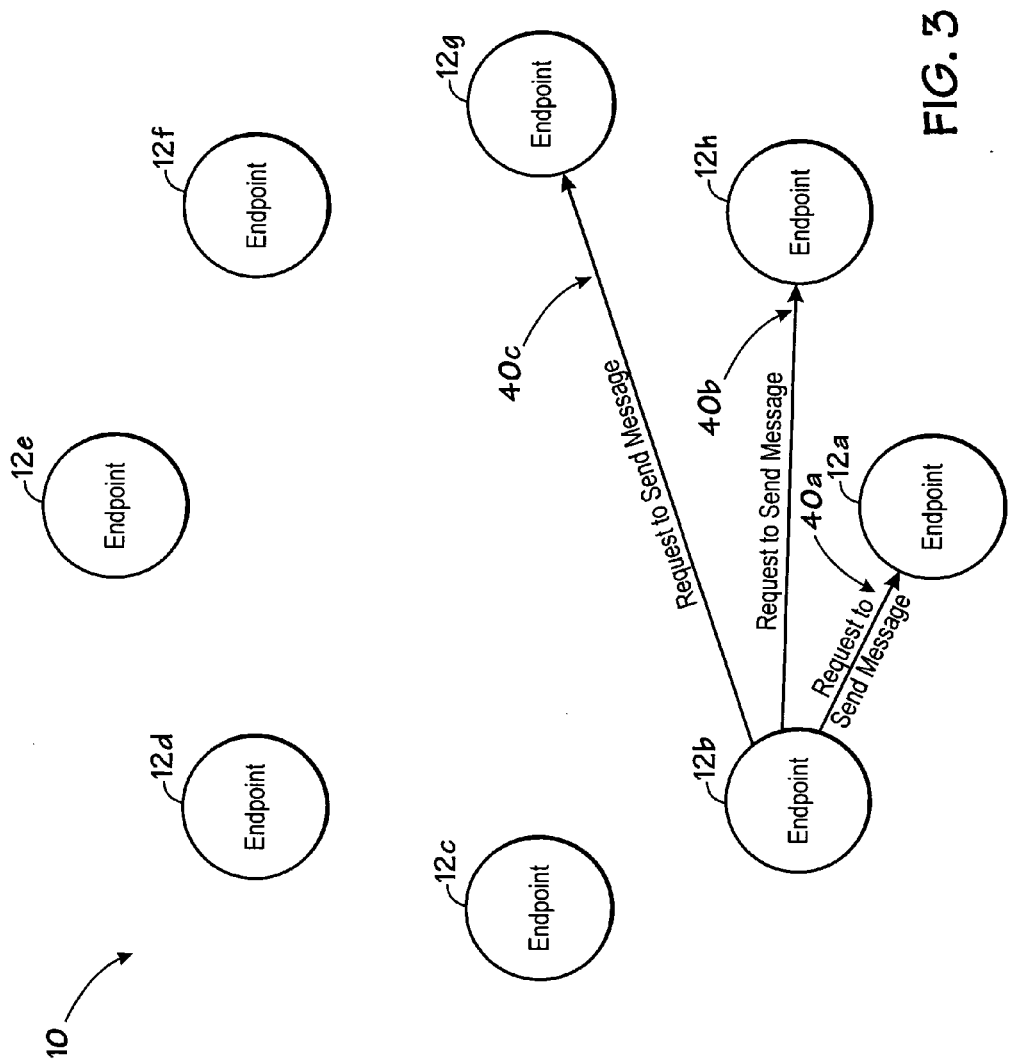
FIG. 3 is a diagram illustrating an endpoint sending a request-to-send messages to other endpoints in accordance with embodiments of the present invention.

As illustrated by block 24, the technique 20 may include a transmitting endpoint, 12b for example, that is configured to send outgoing request-to-send messages to a threshold number (slimit) of other endpoints 12a-h. For example, FIG. 3 illustrates the endpoint 12b sending request-to-send messages 40a, 40b, and 40c to the endpoints 12a, 12g, and 12h. In this example, slimit is set equal to three, and, thus, the endpoint 12b transmits the request-to-send messages 40a, 40b, and 40c to the three endpoints 12a, 12g, and 12h. It will appreciated that for ease of illustration, FIG. 3 depicts communication directly between endpoints 12a-h. It will be understood, however, that the transmissions illustrated are actually transmitted via the connections 14a-h and the switch 16.

Moreover, in one embodiment (such as FIG. 3) the endpoints 12a-h are logically arrayed in a circular configuration in which each of the endpoints 12a-h are arrayed such that another one of the endpoints 12a-h is logically located on the left side of each of the endpoints 12a-h and on the right side of each of the endpoints 12a-h. In this embodiment, the transmitting endpoint 12b may be configured to send request-to-send messages to slimit endpoints based on their location within the circular array. For example, in FIG. 3, the endpoint 12b is configured to transmit the request-to-send messages 40a, 40b, and 40c to the three endpoints 12a, 12b, and 12h arrayed directly to the right logically (counter-clockwise) from the endpoint 12b.

As will be described further below, the endpoint 12b may be configured to proceed around the circular array in this counter-clockwise direction as it completes the all-to-all communication. It will be appreciated, however, transmitting request-to-send messages to other endpoints 12a-h in a counter-clockwise direction is merely one example of a pattern that may be used to transmit request-to-send messages. For example, in alternate embodiments, request-to-send messages may be transmitted to endpoints in a clockwise direction, transmitted based on an offset, or transmitted in another suitable pattern. For example, in one embodiment, the endpoints 12a-h may be configured to send request-to-send messages such that each of the endpoints 12a-h each of the nodes 12a-h only receive no more than a threshold number of request-to-send messages at once. Moreover, in still other alternative embodiments, the endpoints 12a-h may be arrayed in a logical pattern other than a circular array.

As illustrated in FIG. 2, the technique 22 may begin with the receiving endpoints 12a-h receiving one or more of the incoming request-to-send messages 40a, 40b, and 40c. When a particular receiving endpoint 12a-h receives an incoming request-to-send message, that endpoint 12a-h may identify the transmitting endpoint associated with the request-to-send message, as indicated in block 28. Once the receiving endpoint 12a-h has identified which endpoints 12a-h are associated with the incoming request-to-send message, the receiving endpoint will send acknowledgements to a threshold number (rlimit) of the transmitting endpoints. As described above, sending the acknowledgement grants the transmitting endpoint permission to transmit a data message to the receiving endpoint.

Figure 4:
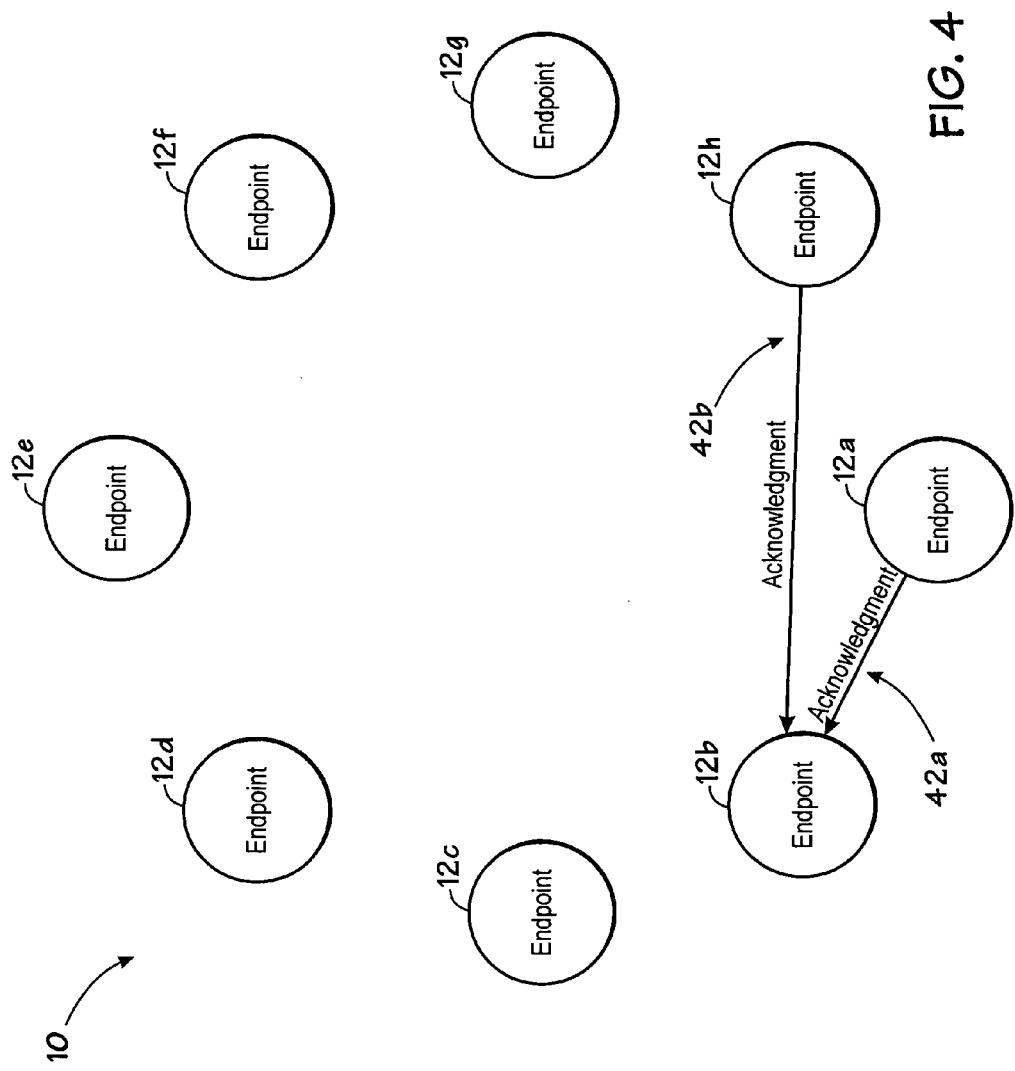
FIG. 4 is a diagram illustrating two endpoints sending an acknowledgement to another endpoint in accordance with embodiments of the present invention.

In various embodiments, there are a variety of techniques that the receiving endpoint that may employ to determine which request-to-send messages are acknowledged. For example, FIG. 4 is a diagram illustrating the endpoints 12a and 12h sending acknowledgements to the endpoint 12b in accordance with one embodiment. In this embodiment, the endpoints 12a-h are configured to send acknowledgements to the two other endpoints 12a-h closest to the left (i.e., clockwise) of the receiving endpoint (rlimit is equal to two). As such, in the illustrated embodiment, the endpoint 12a sends an acknowledgement 42a to the endpoint 12b in response to the request-to-send message 40a (from FIG. 3), and the endpoint 12h sends acknowledgement 42b to the endpoint 12b in response to the request-to-send message 40b. While not illustrated in FIG. 4, the endpoint 12a would also transmit an acknowledgement to the endpoint 12c, and the endpoint 12h would also transmit an acknowledgement to the endpoint 12a.

In alternative embodiments, the endpoints 12a-h may send acknowledgements based on another pattern within the circular array, such as to those endpoints logically arrayed in a counter-clockwise direction. In still other embodiments, each of the endpoints 12a-h may also be configured to explicitly designate which other of the endpoints 12a-h that each particular endpoint 12a-h is willing to acknowledge. For example, in one embodiment, each of the endpoints 12a-h may be configured to acknowledge request-to-send messages in a pre-established order.

Returning now to FIG. 2, the transmitting endpoint, 12b for example, may receive the acknowledgements transmitted by the receiving endpoints 12a and 12h, as indicated by block 32. In response to receiving the acknowledgements, the transmitting endpoint may send data messages to the receiving endpoints 12a and 12h, as indicated in block 34. For example, FIG. 5 is a diagram illustrating the endpoint 12b sending data messages 44a and 44b to the endpoints 12a and 12h in accordance with one embodiment.

Returning again to FIG. 2, after the endpoint 12b has transmitted messages 44a and 44b, the transmitting endpoint 12b may send outgoing request-to-send messages to up to slimit additional endpoints. For example, after completing messages to the endpoints 12a and 12h, the endpoint 12b may begin sending request-to-send message to up to three more endpoints 12a-h (assuming that the slimit is three). In other words, the endpoint may transmit additional request-to-send messages until the number of outstanding request-to-send messages equal slimit.

Accordingly, FIG. 6 is a diagram illustrating the above-described techniques for transmitting and receiving messages at a time period following the transactions illustrated in FIGS. 3, 4, and 5 in accordance with one embodiment. As illustrated, after transmitting data messages to the endpoints 12a and 12h, the endpoint 12b will transmit request-to-send messages 50a, 50b, and 50c to the next three endpoints 12e, 12f, and 12g in a counter-clockwise direction around the circular array of endpoints 12a-h. When the endpoint 12b meets the criteria for sending an acknowledgement, the endpoints 12f and 12g will transmit an acknowledgement 52a and 52b to the endpoint 12b, and the endpoint 12b will consequently transmit data messages 54a and 54b to the endpoints 12f and 12g respectively. This process may continue around the circular array of the endpoints 12a-h until the endpoint 12b has communicated with each of the endpoints 12a-h.

Moreover, because each of the endpoints 12a-h may be configured to simultaneously execute the technique 20 and/or the technique 22, the endpoints 12a-h enable the system 10 to execute all-to-all communication or other forms of inter-endpoint communication while avoiding switch saturation as long as slimit and/or rlimit are selected based on the bandwidth of the connections 14a-h. In other words, switch saturation can be avoided or reduced by limiting the number of messages that each of the endpoints 12a-h can either transmit and/or receive based on the bandwidth of the connections 14a-h. In addition, logically arraying the endpoints of the networked system 10 into the circular array also enables more efficient execution of all-to-all communication with less switch saturation within the networked system 10.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed:

1. A networked system comprising:
a plurality of all-to-all communication endpoints; and
a switch immediately coupled to each of the plurality of all-to-all communication endpoints through which a first endpoint of the plurality of all-to-all communication endpoints directly transmits a data message to each of a set of endpoints comprising all other of the plurality of all-to-all communication endpoints, wherein the data message is transmitted from the first endpoint to a first portion of a the set of endpoints after the first endpoint has transmitted a request-to-send to each of the first portion of the set of endpoints based upon a first logical location of the first portion of the set of endpoints and received an acknowledgment from to each of the first portion of the set of endpoints, wherein the data message is sequentially and subsequently transmitted from the first endpoint to a plurality of subsequent portions of the set of endpoints after the first endpoint has transmitted a request-to-send to each of the plurality of subsequent portions of the set of endpoints based upon a different logical location for each of the plurality of subsequent portions of the set of endpoints and received an acknowledgment from each of the plurality of subsequent portions of the set of endpoints, wherein each portion of set of endpoints includes two or more endpoints.

2. The networked system, as set forth in claim 1, wherein the plurality of endpoints comprise a plurality of processors.

3. The networked system, as set forth in claim 1, wherein the plurality of endpoints comprise a plurality of computers.

4. The networked system, as set forth in claim 1, wherein the plurality of endpoints are arrayed in a logical structure and wherein each of the endpoints is configured to transmit data messages to the other endpoints in an order determined by each endpoint's location within the logical structure.

5. The networked system, as set forth in claim 3, wherein the plurality of endpoints are arrayed in a circular logical structure and wherein each of the endpoints is configured to transmit data messages to the other endpoints in an order moving in a given direction around the circular logical structure.

6. The networked system, as set forth in claim 1, wherein each of the endpoints is configured to transmit data messages related to an all-to-all communication amongst the plurality of endpoints.

7. The networked system, as set forth in claim 1, wherein each of the endpoints is configured to transmit data messages that conform to a message passing interface protocol.

8. The networked system, as set forth in claim 1, comprising a switch coupled to each of the plurality of endpoints by a plurality of connections.

9. A method comprising:
transmitting a first plurality of request-to-send messages from a first all-to-all communication endpoint, through a switch immediately coupled to each of a plurality of all-to-all communication endpoints, to a first portion of the plurality of endpoints based upon a first logical location of the first portion of the plurality of endpoints, wherein a number of transmitted request-to-send messages is greater than one and does not exceed a threshold number that is less than the total number of endpoints;
receiving an acknowledgment from one or more of the first portion of the plurality of endpoints in response to the transmitted request-to-send messages;
sending a data message from the first all-to-all communication endpoint, through the switch, directly to the one or more acknowledging endpoints of the first portion of the plurality of endpoints;
transmitting a sequential and subsequent plurality of request-to-send messages from the first all-to-all communication endpoint, through the switch, to a plurality of subsequent portions of the set of endpoints based upon a different logical location for each of the subsequent portions of the set of endpoints;
receiving an acknowledgment from each endpoint of the plurality of subsequent portions of the set of endpoints in response to the transmitted request-to-send messages; and
sending the data message from the first all-to-all communication endpoint, through the switch, directly to the each endpoint of the plurality of subsequent portions of the set of endpoints, wherein each portion of set of endpoints includes two or more endpoints.

10. The method, as set forth in claim 9, wherein transmitting the request-to-send messages to the first portion of the plurality of endpoints comprises transmitting the request-to-send messages to a plurality of processors.

11. The method, as set forth in claim 9, wherein transmitting the request-to-send messages comprises transmitting the request-to-send messages to the first portion of the plurality of endpoints, which are logically arrayed in a circular structure.

12. The method, as set forth in claim 11, wherein transmitting the request-to-send messages comprises transmitting the request-to-send messages to the first portion of the plurality of endpoints in an order based on their location within the circular structure.

13. The method, as set forth in claim 9, wherein a number of the second plurality of request-to-send messages transmitted messages does not exceed the threshold number, wherein the another plurality of request-to-send messages are transmitted after the data messages are sent to the acknowledging endpoints.

14. The method, as set forth in claim 9, wherein transmitting the request-to-send messages comprises transmitting the request-to-send messages that conform to a message passing interface protocol.

15. A method comprising:
receiving from a first all-to-all communication endpoint, through a switch immediately coupled to each of a plurality of all-to-all communication endpoints, a first plurality of request-to-send messages associated with a first portion of the plurality of endpoints and based upon a first logical location of the first portion of the plurality of endpoints;
selecting a subset of the first portion of the plurality of endpoints, wherein the number of endpoints in the subset is greater than one and does not exceed a threshold level that is less than the number of endpoints in the plurality of endpoints;
sending acknowledgement messages from the first all-to-all communication endpoint, through the switch, directly to the subset of the first portion of the plurality of the endpoints;
receiving, from the first all-to-all communication endpoint, through the switch a sequential and subsequent plurality of request-to-send messages associated with a plurality of subsequent portions of the plurality of endpoints and based upon a different logical location for each of the subsequent portions of the set of endpoints;
selecting a subset of the subsequent portions of the set of endpoints; and
sending acknowledgement messages from the first all-to-all communication endpoint, through the switch, directly to the subset of the subsequent portion of the plurality of the endpoints, wherein each of the plurality of endpoints is sent an acknowledgement message.

16. The method, as set forth in claim 15, comprising:
identifying the endpoints associated with the received request-to-send messages, wherein selecting the subset comprises selecting the subset of the first portion of the plurality of endpoints based on an attribute of the identified endpoints.

17. The method, as set forth in claim 16, wherein selecting the subset of the first portion of the plurality of endpoints comprises selecting the subset based on each identified endpoint's location within a logical circular array of endpoints.

18. The method, as set forth in claim 15, wherein selecting the subset of the first portion of the plurality of endpoints comprises selecting the subset of the first portion of the plurality of endpoints based on a stored endpoint order.

19. The method, as set forth in claim 15, wherein receiving a plurality of request-to-send messages comprises receiving a plurality of request-to-send messages associated with a plurality of processors.

\* \* \* \* \*

UNITED STATES PATENT AND TRADEMARK OFFICE
CERTIFICATE OF CORRECTION

| | | |
|---|---|---|
| PATENT NO. | : 8,924,590 B2 | Page 1 of 1 |
| APPLICATION NO. | : 11/353548 | |
| DATED | : December 30, 2014 | |
| INVENTOR(S) | : David George Solt et al. | |

It is certified that error appears in the above-identified patent and that said Letters Patent is hereby corrected as shown below:

In the Claims

In column 7, line 2, in Claim 1, delete "a the" and insert -- the --, therefor.

In column 7, line 6, in Claim 1, delete "from to" and insert -- from --, therefor.

Signed and Sealed this
Twenty-eighth Day of April, 2015

Michelle K. Lee
*Director of the United States Patent and Trademark Office*